(12) United States Patent
Lee et al.

(10) Patent No.: US 6,641,645 B1
(45) Date of Patent: Nov. 4, 2003

(54) VACUUM SWING ADSORPTION PROCESS WITH CONTROLLED WASTE GAS WITHDRAWAL

(75) Inventors: Sang Kook Lee, Allentown, PA (US); Justin David Bukowski, Lenhartsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/171,183

(22) Filed: Jun. 13, 2002

(51) Int. Cl.[7] ............................................. B01D 53/047
(52) U.S. Cl. ................ 95/98; 95/101; 95/102; 95/105; 95/130
(58) Field of Search ........................ 95/96–98, 100–105, 95/130, 138

(56) References Cited

U.S. PATENT DOCUMENTS

| | | | |
|---|---|---|---|
| 3,636,679 A | 1/1972 | Batta | 55/26 |
| 3,738,087 A | 6/1973 | McCombs | 55/58 |
| 4,077,780 A | 3/1978 | Doshi | 55/26 |
| 4,589,888 A | 5/1986 | Hiscock et al. | 55/26 |
| 4,684,377 A | 8/1987 | Haruna et al. | 55/26 |
| 4,781,735 A | 11/1988 | Tagawa et al. | 55/26 |
| 4,917,710 A | 4/1990 | Haruna et al. | 55/26 |
| 4,969,935 A | 11/1990 | Hay | 55/26 |
| 5,015,271 A | 5/1991 | Reiss | 55/25 |
| 5,015,272 A | 5/1991 | Okada et al. | 55/26 |
| 5,122,164 A | 6/1992 | Hirooka et al. | 55/26 |
| 5,294,247 A * | 3/1994 | Scharpf et al. | 95/101 |
| 5,328,503 A | 7/1994 | Kumar et al. | 95/101 |
| 5,330,561 A * | 7/1994 | Kumar et al. | 95/101 |
| 5,346,536 A | 9/1994 | Kaneshige et al. | 95/103 |
| 5,411,578 A | 5/1995 | Watson et al. | 95/101 |
| 5,429,666 A | 7/1995 | Agrawal | 95/101 |
| 5,518,526 A * | 5/1996 | Baksh et al. | 95/100 |
| 5,520,720 A | 5/1996 | Lemcoff | 95/96 |
| 5,529,607 A * | 6/1996 | Tan | 95/12 |
| 5,536,299 A | 7/1996 | Girard et al. | 95/101 |
| 5,540,758 A | 7/1996 | Agrawal et al. | 95/101 |
| 5,656,067 A | 8/1997 | Watson et al. | 95/101 |
| 5,702,504 A | 12/1997 | Schaub et al. | 95/101 |
| 5,755,856 A | 5/1998 | Miyake et al. | 95/101 |
| 6,007,606 A * | 12/1999 | Baksh et al. | 95/98 |
| 6,045,603 A * | 4/2000 | Chen et al. | 95/101 |
| 6,048,384 A * | 4/2000 | Smolarek | 95/98 |
| 6,083,299 A * | 7/2000 | Kapoor et al. | 95/100 |
| 6,113,672 A * | 9/2000 | Kapoor et al. | 95/101 |
| 6,277,174 B1 * | 8/2001 | Neu et al. | 95/12 |

FOREIGN PATENT DOCUMENTS

| | | | |
|---|---|---|---|
| EP | 0248922 | 9/1990 | B01D/53/04 |
| EP | 0449448 | 1/1997 | B01D/53/04 |

* cited by examiner

*Primary Examiner*—Robert H. Spitzer
(74) *Attorney, Agent, or Firm*—John M. Fernbacher

(57) ABSTRACT

A gas transfer segment of a vacuum swing adsorption process cycle utilizing multiple parallel adsorbent beds which undergo cyclic process steps to separate the components of a feed gas mixture, each bed having a feed end and a product end, wherein the gas transfer segment comprises a step of withdrawing a waste gas stream from the feed end of a first bed, withdrawing a transfer gas from the product end of the first bed and introducing the transfer gas into the product end of a second bed, and withdrawing a waste gas stream from the feed end of the second bed.

17 Claims, 2 Drawing Sheets

VACUUM SWING ADSORPTION PROCESS WITH CONTROLLED WASTE GAS WITHDRAWAL

BACKGROUND OF THE INVENTION

Pressure swing adsorption is an important gas separation process which is widely used in the process and manufacturing industries. Pressure swing adsorption is used for recovering high-purity gas products from crude process gas streams, for example in hydrogen production, or as an alternative to hauled-in atmospheric gas products or onsite cryogenic air separation processes. The pressure swing adsorption process has been highly developed for the separation of a wide variety of gas mixtures including, for example, the separation of air to provide oxygen and nitrogen products.

Pressure swing adsorption processes can be operated wherein the maximum and minimum cycle pressures are both superatmospheric, wherein the maximum cycle pressure is superatmospheric and the minimum cycle pressure is subatmospheric, or wherein the maximum cycle pressure is near atmospheric and the minimum cycle pressure is subatmospheric. The latter two processes have been described in the art as vacuum-pressure swing adsorption (VPSA) and vacuum swing adsorption (VSA). For the purposes of the present disclosure, the generic term "vacuum swing adsorption" or VSA will be used to describe any cyclic gas adsorption process which utilizes the effect of pressure on adsorbent capacity to separate gas mixtures wherein at least a portion of the adsorption cycle is operated at subatmospheric pressure.

Each adsorbent bed in a VSA cycle proceeds through a sequence of steps beginning with a feed or adsorption step in which a pressurized feed gas mixture is passed through a bed of adsorbent which selectively adsorbs one or more of the components in the mixed feed gas. A product gas containing the desired component at acceptable purity is withdrawn from the bed until the adsorption step is terminated at a predetermined time.

After termination of the adsorption step, the pressure in the bed is reduced in one or more steps in which gas is transferred at decreasing pressure to one or more other beds to provide pressurization gas to those beds. Final depressurization typically is completed by evacuation using a vacuum blower. The depressurized bed then is purged with product gas or transfer gas provided from other beds, thereby removing additional adsorbed components and void space gas from the bed.

Upon completion of the purge step, the bed is repressurized to an intermediate pressure by one or more pressurization steps in which gas is transferred from other beds, and the bed then is pressurized further to the feed pressure with feed and/or product gas. The steps are repeated in a cyclic manner.

The transfer of gas from a bed at decreasing pressure to another bed at increasing pressure is a useful feature of many VSA cycles. In this bed-to-bed gas transfer process, gas that is below product quality, but that still contains a significant concentration of the final product component, is transferred from the product end of a bed to the product end of another bed. This step may increase product recovery, but must be carefully controlled to meet the required product purity.

Further refinement in the bed-to-bed gas transfer process holds promise for needed improvements in product recovery and product purity, and also for increased productivity, in the VSA process. In particular, there is a need for improved control of gas flow within a bed undergoing gas withdrawal during the gas transfer process. This need is addressed by the present invention as described below and defined by the claims which follow.

BRIEF SUMMARY OF THE INVENTION

The invention relates to a gas transfer segment of a vacuum swing adsorption process cycle utilizing multiple parallel adsorbent beds which undergo cyclic process steps to separate the components of a feed gas mixture, each bed having a feed end and a product end, wherein the gas transfer segment comprises a step of withdrawing a waste gas stream from the feed end of a first bed, withdrawing a transfer gas from the product end of the first bed and introducing the transfer gas into the product end of a second bed, and withdrawing a waste gas stream from the feed end of the second bed.

The gas transfer segment also comprises terminating the withdrawing of the waste gas stream from the feed end of the second bed while continuing to withdraw the waste gas stream from the feed end of the first bed, continuing to withdraw the transfer gas from the product end of the first bed, and continuing to introduce the transfer gas into the product end of the second bed.

The gas transfer segment may further comprise introducing the feed gas mixture into the feed end of the second bed while continuing to withdraw the waste gas stream from the feed end of the first bed, continuing to withdraw the transfer gas from the product end of the first bed, and continuing to introduce the transfer gas into the product end of the second bed.

The feed gas mixture may be air, the pressure in the second bed may be below atmospheric pressure, and the feed gas mixture may be introduced into the feed end of the second bed by atmospheric air flowing into the feed end of the second bed. The waste gas streams may be enriched in nitrogen relative to air.

The invention includes a vacuum swing adsorption process for recovering a less strongly adsorbable component from a feed gas mixture containing at least one less strongly adsorbable component and at least one more strongly adsorbable component, which process comprises performing cyclic process steps in a plurality of adsorbent beds, each bed having a feed end and a product end and containing adsorbent material which selectively adsorbs the more strongly adsorbable component, each bed proceeding in turn through cyclic process segments which include an adsorption-make product segment, a decreasing pressure gas transfer segment in which gas flows from a bed at higher pressure into one or more other beds at lower pressure or pressures, a regeneration segment, an increasing pressure gas transfer segment in which gas flows into a bed at lower pressure from one or more other beds at higher pressure or pressures, and a final repressurization segment, wherein the decreasing pressure gas transfer segment includes a step of withdrawing a first waste gas stream from the feed end of a first bed, withdrawing a transfer gas from the product end of the first bed and introducing the transfer gas into the product end of a second bed, and withdrawing a second waste gas stream from the feed end of the second bed.

The process also comprises terminating the withdrawing of the second waste gas stream from the feed end of the second bed, withdrawing a third waste gas stream from the feed end of the first bed, continuing to withdraw the transfer gas from the product end of the first bed, and continuing to introduce the transfer gas into the product end of the second bed. The process may further comprise introducing the feed gas mixture into the feed end of the second bed, withdrawing a fourth waste gas stream from the feed end of the first bed, continuing to withdraw the transfer gas from the product end of the first bed, and continuing to introduce the transfer gas into the product end of the second bed. The ratio of the quantity of the first waste gas stream to the total quantity of the first, third, and fourth waste gas streams may be between about 0.15 and about 0.30.

The feed gas mixture may be air and the pressure in the second bed may be below atmospheric pressure so that atmospheric air flows into the feed end of the second bed. The waste gas streams may be enriched in nitrogen relative to air. The first waste gas stream may be withdrawn by discharging from a superatmospheric pressure in the first bed directly to the atmosphere, and the third waste gas stream may be withdrawn from the first bed by a vacuum blower.

The invention includes a pressure swing adsorption process for recovering a less strongly adsorbable component from a pressurized feed gas containing at least one less strongly adsorbable component and at least one more strongly adsorbable component, which process comprises performing cyclic process steps in two parallel adsorbers, each adsorber having a feed end and a product end and containing adsorbent material which selectively adsorbs the more strongly adsorbable component, which cyclic process steps include:

(a) providing a feed gas at superatmospheric pressure and introducing the feed gas into the feed end of a first adsorber, selectively adsorbing a portion of the more strongly adsorbable component on the adsorptive material, and withdrawing from the product end of the first adsorber a product gas enriched in the less strongly adsorbable component;

(b) terminating the introduction of the feed gas into the feed end of the first adsorber, depressurizing the first adsorber by withdrawing a first waste gas stream from the feed end of the first adsorber and by withdrawing a transfer gas from the product end of the first adsorber, introducing the transfer gas into the product end of a second adsorber, and withdrawing a second waste gas stream from the feed end of the second adsorber;

(c) terminating withdrawal of the transfer gas from the product end of the first adsorber and withdrawing a third waste gas from the feed end of the first adsorber;

(d) pressurizing the first adsorber by any combination of (1) introducing feed gas into the feed end thereof; (2) introducing product gas into the product end thereof, and (3) introducing feed gas into the feed end thereof and introducing product gas into product the product end thereof; and (e) repeating steps (a) through (d) in a cyclic manner.

The feed gas may be air, the at least one less strongly adsorbable component may be oxygen and the at least one more strongly adsorbable component may be nitrogen, the first waste gas stream from the first adsorber may be discharged directly to the atmosphere, and the third waste gas stream may be withdrawn from the first adsorber by evacuation with a vacuum blower.

The process may further comprise, following step (a), the additional step of withdrawing a portion of the product gas from the first adsorber and using this portion of gas to purge the second adsorber.

The process may further comprise, following step (b), the additional step of (b1) terminating the withdrawing of the second waste gas stream from the feed end of the second adsorber, withdrawing a fourth waste gas stream from the feed end of the first adsorber, continuing to withdraw the transfer gas from the product end of the first adsorber, and continuing to introduce the transfer gas into the product end of the second adsorber. The process may further comprise, following step (b1), the additional step of (b2) withdrawing a fifth waste gas stream from the feed end of the first adsorber, continuing to transfer gas from the product end of the first adsorber to the product end of the second adsorber, and introducing feed gas into the feed end of the second adsorber.

The feed gas may be air, the at least one less strongly adsorbable component may be oxygen and the at least one more strongly adsorbable component may be nitrogen. The first waste gas stream from the first adsorber may be discharged directly to the atmosphere, and the third, fourth, and fifth waste gas streams may be withdrawn from the first adsorber by evacuation with a vacuum blower. When the feed gas mixture is air, the pressure in the second adsorber may be below atmospheric pressure, and the feed gas mixture may be introduced into the feed end of the second adsorber by atmospheric air flowing into the feed end of the second adsorber.

DETAILED DESCRIPTION OF THE INVENTION

Figure 1:
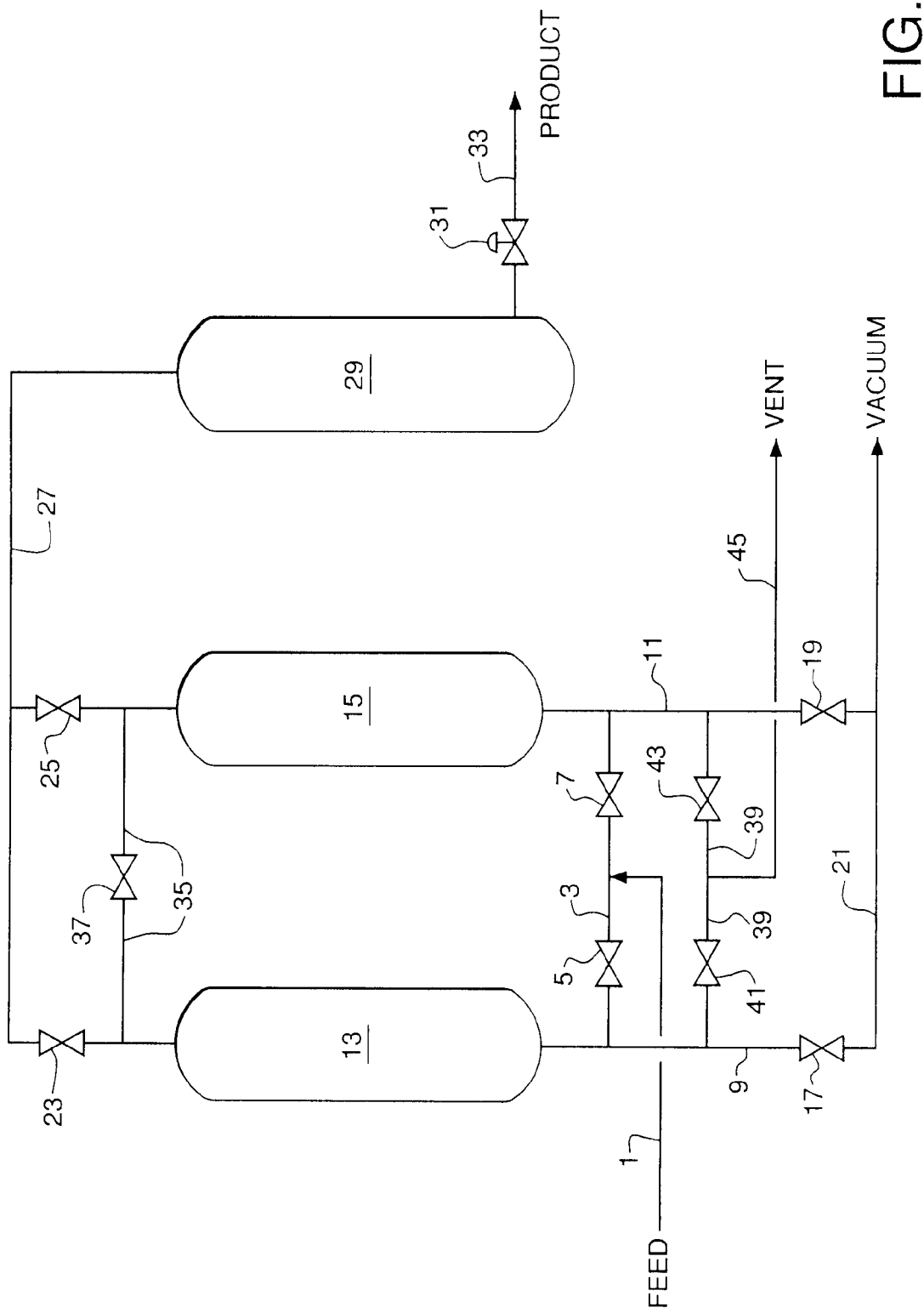
FIG. 1 is an exemplary process flow diagram of a VSA system which may be used in the operation of the present invention.

The present invention relates to vacuum swing adsorption process cycles with particular emphasis on aspects of the gas transfer steps in which gas is transferred from a bed at higher pressure to another bed or beds at lower pressure or pressures. In the following discussion, the VSA cycle is defined as a series of process segments, each of which comprises one or more individual process steps. One or more of these process steps may be optional. The process segments as defined below for each adsorber containing an adsorbent bed are (1) an adsorption/make product segment, (2) a decreasing pressure gas transfer segment, (3) a bed regeneration segment, (4) an increasing pressure gas transfer segment, and (5) a bed repressurization segment.

The adsorption/make product segment is defined as the withdrawal of product gas from an adsorbent bed during which feed gas is introduced into the bed for at least a portion of the segment. The more strongly adsorbed component or components are selectively adsorbed by the adsorbent material during this segment. A portion of the product gas may be used in another bed undergoing other process steps; for example, a portion of the product gas may be used for purging another bed in the regeneration segment.

The decreasing pressure gas transfer segment is defined as one or more steps in which gas is transferred from a bed at higher pressure to one or more other beds at lower pressure or pressures. During one or more of these steps, waste gas is discharged from the feed end of the higher pressure bed. Transfer gas is defined as the gas transferred during a gas transfer segment. Gas transfer is driven by the pressure differential between the higher pressure bed and the lower pressure bed or beds.

The regeneration segment is defined as the removal of remaining adsorbed components and residual void space gas from the bed, typically in at least two steps. In a first step, waste gas may be withdrawn from the feed end of the bed by a vacuum blower. In a second step, the bed may be purged by introducing a purge gas into the product end of the bed while withdrawing waste gas from the feed end of the bed by a vacuum blower. A portion or all of the regeneration segment typically occurs at subatmospheric pressure.

The increasing pressure gas transfer segment is defined as one or more steps in which gas is transferred to a bed at lower pressure from one or more other beds at higher pressure or higher pressures. Gas transfer is driven by the pressure differential between the lower pressure bed and the higher pressure bed or beds.

The bed repressurization segment is defined as pressurizing the first bed by one or more steps selected from the group consisting of introducing product gas into the product end thereof, introducing pressurized feed gas mixture into the feed end thereof, and introducing product gas into the product end thereof while also introducing pressurized feed gas into the feed end thereof. If the feed gas mixture is atmospheric air, repressurization may include the flow of atmospheric air into a bed which is at subatmospheric pressure.

The generic term "gas transfer segment" is defined to include both the decreasing pressure and increasing pressure gas transfer segments defined above, and therefore includes by definition the transfer of gas between any bed and one or more other beds.

The terms "more strongly adsorbable" and "less strongly adsorbable", when used to describe components in a gas mixture being separated by a pressure or vacuum swing adsorption process, describe the relative adsorption characteristics of components in the gas mixture on a given adsorbent material. The equilibrium adsorption capacity of the adsorbent material for the more strongly adsorbable component (as a pure component) is greater than the equilibrium adsorption capacity of the adsorbent material for the less strongly adsorbable component (as a pure component) at the average temperature and pressure of the process.

In all embodiments of the invention described below, the decreasing pressure gas transfer segment includes one or more steps in which waste gas is discharged from the feed end of the bed while gas is transferred from the product end of the bed to another bed or other beds at lower pressure or lower pressures.

Waste gas is defined as a byproduct gas withdrawn in any of the steps in the decreasing pressure gas transfer segment and regeneration segments of a cycle. Waste gas is enriched in the more strongly adsorbed component in the feed gas. Waste gas generally includes void space gas, desorbed gas, and purge effluent gas, and waste gas may be discharged or withdrawn from an adsorbent bed by direct venting or mechanical evacuation.

Waste gas discharge during the decreasing pressure gas transfer segment may be effected by any of the following methods individually or in combination: (1) when air is the feed gas mixture being separated, waste gas discharge may be driven by the differential pressure between the bed pressure and atmospheric pressure, and the waste gas may be discharged directly to the atmosphere; (2) waste gas may be discharged into a vessel or reservoir which is initially at a lower pressure than the bed pressure and the discharged gas may be utilized as a secondary gas product enriched in the more strongly adsorbed component; and (3) waste gas may be discharged by evacuating the bed using a vacuum blower.

The invention can be utilized in process cycles with multiple parallel adsorbent beds and may be used with two parallel beds operating in conjunction with a product gas storage tank. The gas storage tank provides a constant product gas supply to the user and also may provide product gas for repressurization and/or purge.

The features of the present invention can be applied in process cycles which utilize two or more adsorbent beds and can be used generically to separate any gas mixture which contains components which are more strongly adsorbed and other components which are less strongly adsorbed by the adsorbent material in the beds. The invention is particularly useful for the recovery of oxygen from air, and can be operated economically with two adsorbent beds.

FIG. 1 is a schematic flow diagram for a two-bed VSA system that may be utilized for operation of the VSA process of the present invention. The invention is illustrated below for the recovery of oxygen from air, but is not limited to this separation and is not limited to this particular system or process steps. Any appropriate type of VSA system known in the art may be utilized for practice of the invention. The system of FIG. 1 includes feed line 1 which provides pressurized feed air from a feed air compressor (not shown), feed manifold 3, and feed valves 5 and 7. Manifolds 9 and 11 are connected to the inlet or feed ends of adsorber vessels 13 and 15 respectively. Adsorber vessels 13 and 15 contain one or more adsorbents which adsorb nitrogen more strongly than oxygen, that is, the equilibrium capacity of the adsorbent for nitrogen is higher than that for oxygen. Adsorbents which can be used in the process include X-type zeolites containing monovalent cations, divalent cations, or a combination of monovalent or divalent cations. Valves 17 and 19 connect manifolds 9 and 11 to vacuum manifold 21, which is connected to a vacuum blower (not shown).

The outlet or product ends of adsorber vessels 13 and 15 are connected via valves 23 and 25 respectively to product manifold 27, which in turn is connected to product storage tank 29. Product gas may be withdrawn via flow control valve 31 and line 33. The outlet or product ends of adsorber vessels 13 and 15 are connected via manifold 35 and valve 37. Manifolds 9 and 11 are connected by vent manifold 39 and valves 41 and 43, and vent line 45 is connected to vent manifold 39.

An embodiment of the invention is illustrated below for the recovery of oxygen from air and describes the cycle steps occurring in vessel 13 with reference to the schematic flow diagram of FIG. 1. The entire process cycle for both vessels 13 and 15 is illustrated in the bed step diagram of FIG. 2, where it is seen that the cycle of vessel 13 operates 180 degrees out of phase with the cycle of vessel 15. This is an exemplary cycle and the invention is not limited by any specific cycle step or steps described below.

1. Adsorption/Make Product Segment

Step (1a): Feed air is provided at a typical pressure of 15 to 30 psia via line 1, flows through feed manifold 3 and valve 5, and flows through manifold 9 into adsorber vessel 13. Nitrogen is preferentially adsorbed therein and an oxygen product which may contain 70 to 95 vol % oxygen flows through valve 23 and manifold 27 into product tank 29. Final product oxygen is withdrawn via valve 31 and line 33 to the user. The duration of this step is typically 2 to 30 seconds and the end-of-step pressure may be in the range of 18 to 30 psia.

Step (1b): While the operation of step (1a) continues, a portion of the product gas from adsorber vessel 13 is withdrawn through manifold 35 and valve 37 to purge adsorber vessel 15. This step may continue for 0 to 20 seconds with a typical end-of-step pressure of 18 to 30 psia. Step (1b) is optional.

2. Decreasing Pressure Gas Transfer Segment

Step (2a): Valves 5 and 23 are closed, valve 41 is opened, and valve 37 remains open. Gas is transferred from adsorber vessel 13 through manifold 35 and valve 37 into adsorber vessel 15. Simultaneously, a first waste gas stream is withdrawn from the feed end of adsorber vessel 13 through manifold 39, valve 41, and vented to the atmosphere via line 45. This step may continue for 1 to 10 seconds and may end when the pressure in adsorber vessel 13 in the range of 16 to 28 psia.

Step (2b): While the product-end-to-product-end gas transfer of step (2a) continues, valve 41 closes and valve 17 opens, and a second waste gas stream is withdrawn through manifold 9, valve 17, and line 21 to the vacuum blower. The gas transferred via valve 37 and manifold 35 pressurizes vessel 15. This step may continue for 1 to 10 seconds and typically ends when the pressure in adsorber vessel 13 is in the range of 14 to 26 psia.

Step (2c): Gas transferred via valve 37 and manifold 35 continues to pressurize vessel 15 while simultaneously vessel 15 receives feed air pressurization at the feed end. A third waste gas stream is withdrawn from the feed end of vessel 13 through manifold 9, valve 17, and line 21 to the vacuum blower. This step typically lasts for 0 to 10 seconds and the pressure in adsorber vessel 13 at the end of step (2c) may be in the range of 10 to 22 psia. Step (2c) is optional.

The ratio of the quantity of the first waste gas stream in step (2a) to the total quantity of the first waste gas stream, the second waste gas stream in step (2b), and the third waste gas stream in step (2c) may be between about 0.15 and about 0.30.

3. Regeneration Segment

Step (3a): Valve 37 closes and waste gas withdrawal continues by evacuation through valve 17 and line 21. Step (3a) typically lasts for 7 to 60 seconds and may end when the pressure in bed 13 is in the range of 3 to 8 psia.

Step (3b): Valve 37 opens and product purge gas flows from adsorber vessel 15 (which is on step (1b) via manifold 35 while evacuation of waste gas continues via valve 17 and line 21. Step (3b) typically lasts for 0 to 20 seconds and may be terminated at an end-of-step pressure in the range of 3 to 8 psia. Step (3b) is optional.

4. Increasing Pressure Gas Transfer Segment

Step (4a): Valve 37 remains open and gas continues to flow into vessel 13 from vessel 15, which begins its decreasing pressure gas transfer steps (2a). Evacuation of waste gas from vessel 13 continues via valve 17 and line 21. Step (4a) typically lasts for 1 to 10 seconds and may be terminated at an end-of-step pressure in the range of 4 to 9 psia.

Step (4b): Valve 17 closes and transfer gas continues to flow through manifold 35 and valve 37 into vessel 13 as pressure therein increases. Step (4b) typically lasts for 1 to 10 seconds and ends at an end-of-step pressure of 5 to 15 psia.

Step (4c): Valve 5 opens to allow feed air to flow into the feed end of vessel 13 and the pressure therein continues to increase while transfer gas continues to flow into the vessel through manifold 35 and valve 37. This step may continue for 0 to 10 seconds and typically ends when the pressure in vessel 13 is in the range of 7 to 17 psia. When the pressure in the vessel is below atmospheric, some or all of the feed air may be provided by atmospheric air which has not passed through the feed blower. Step (4c) is optional.

5. Repressurization Segment

Step (5a): Valve 37 closes and repressurization of vessel 13 proceeds as feed air continues to flow via valve 5 and manifold 9 into the vessel. This step may last for 5 to 40 seconds and ends when the vessel pressure reaches 13 to 18 psia. When the pressure in the vessel is below atmospheric, some or all of the feed air may be provided by atmospheric air which has not passed through the feed blower.

Step (5b): Feed air from the feed compressor begins to flow through valve 5 and manifold 9 into vessel 13 while valve 23 opens to admit product gas from tank 29 via manifold 27. This step may last for 0 to 8 seconds and ends when the vessel pressure reaches 13 to 27 psia. When the pressure in the vessel is below atmospheric, some or all of the feed air may be provided by atmospheric air which has not passed through the feed blower. Step (5b) is optional.

Step (5c): Valve 23 closes and the feed air continues to flow into vessel 13 via valve 5 and manifold 9. This final repressurization step may last for 0 to 20 seconds and ends when the vessel pressure reaches 16 to 27 psia. When the pressure in the vessel is below atmospheric, some or all of the feed air may be provided by atmospheric air which has not passed through the feed blower. Step (5c) is optional.

Alternative repressurization steps may be used instead of the above steps (5a), (5b), and (5c), and repressurization may be accomplished by any desired combination of product gas via valve 23 and manifold 27, atmospheric air via valve 5 and manifold 9, and feed gas via valve 5 and manifold 9. Adsorber vessel 15 proceeds through the same steps described above, but 180 degrees out of phase, as shown in Table 2 below.

The term atmospheric air as used herein is defined as ambient air at ambient pressure which has not been compressed or pressurized by a blower or compressor.

The following Example illustrates the present invention but does not limit the invention to any of the specific details or steps described therein.

EXAMPLE

Figure 2:
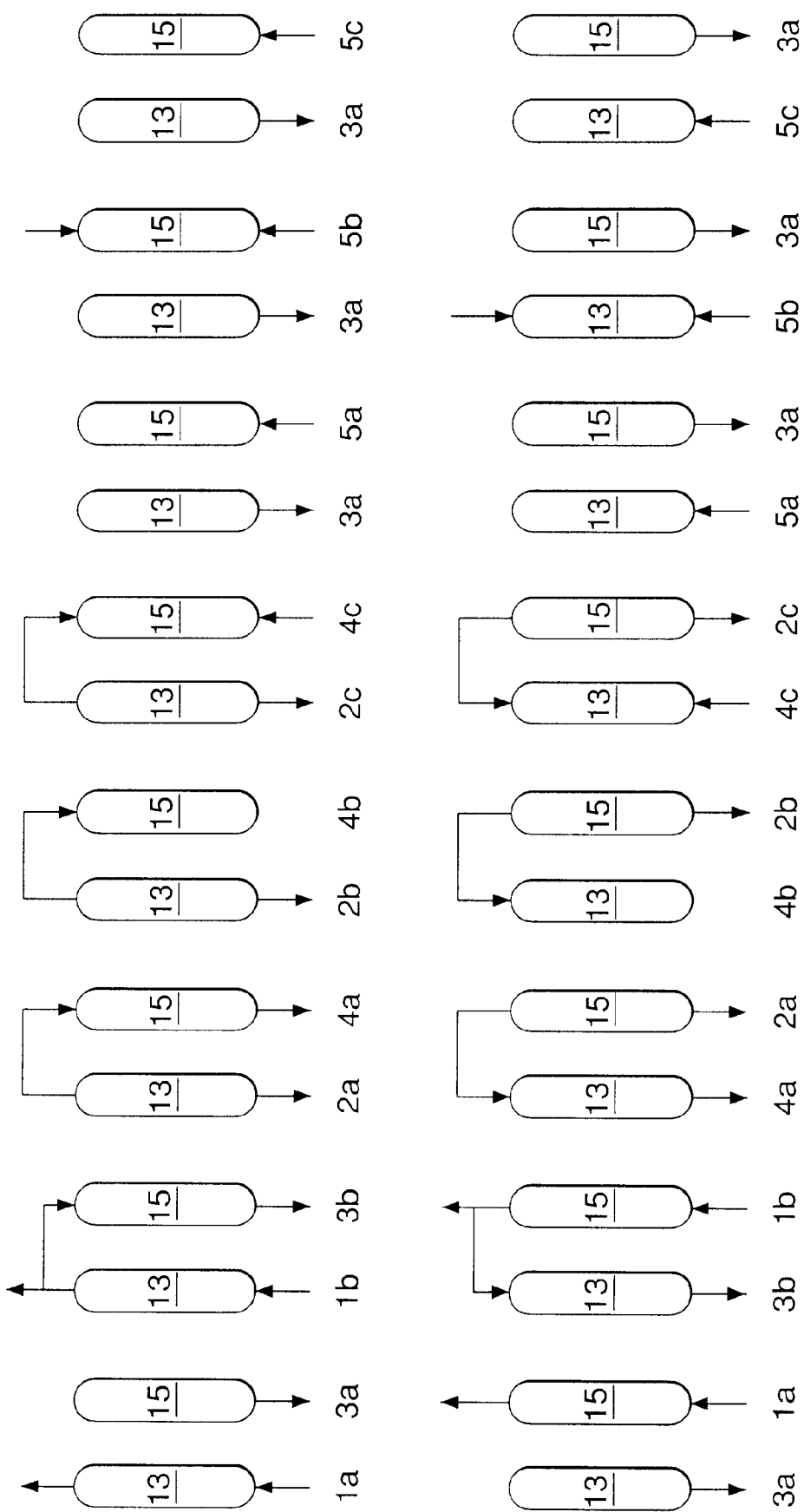
FIG. 2 is an exemplary bed step diagram of an embodiment of the present invention.

A two-bed VSA process utilizing cycle segments 1 through 5 described above is operated according to the process flowsheet of FIG. 1 and the cycle step diagram of FIG. 2, except that step (5b) is not used. The process separates feed air supplied at a pressure of 21.5 psia to yield oxygen product containing 93 vol % oxygen. Adsorbent beds 13 and 15 contain a monovalent cation-exchanged X-type zeolite. The cycle times and end-of-step pressures are summarized for the Example in Table 1. The relationship of the cycle steps between the two beds and the valve positions corresponding to these steps are shown in Table 2.

TABLE 1

Cycle Times and Pressures for Each Bed

| Cycle Segment | Step | End of-step pressure, psia | Duration, seconds |
|---|---|---|---|
| Adsorption/Make Product | 1a | 21.1 | 2.6 |
| | 1b | 21.4 | 8.0 |

TABLE 1-continued

Cycle Times and Pressures for Each Bed

| Cycle Segment | Step | End of-step pressure, psia | Duration, seconds |
|---|---|---|---|
| Decreasing Pressure | 2a | 18.8 | 3.0 |
| Gas Transfer | 2b | 15.2 | 1.0 |
|  | 2c | 12.1 | 2.4 |
| Regeneration | 3a | 5.9 | 15.1 |
|  | 3b | 5.0 | 8.0 |
| Increasing Pressure | 4a | 5.7 | 3.0 |
| Gas Transfer | 4b | 7.8 | 1.0 |
|  | 4c | 11.4 | 2.4 |
| Repressurization | 5a | 14.3 | 3.5 |
|  | 5c | 20.5 | 9.0 |

The exemplary embodiments described above utilize two adsorbent beds, but the invention optionally may be utilized with more than two beds. In this option, gas transferred during the decreasing pressure gas transfer segment would be transferred from a given bed at higher pressure to each of the other beds in turn at lower pressures. Gas transferred during the increasing pressure gas transfer segment would be transferred to a given bed at lower pressure from each of the other beds in turn at higher pressures.

An advantage of the invention is that a first bed can be depressurized from the feed end while transferring gas from the product end to the product end of a second bed, which is being evacuated at the feed end by a vacuum blower. This maximizes vacuum blower utilization and saves cycle time, since the evacuation time of the first bed may be reduced as a result of earlier depressurization. Another advantage is that depressurization of the first bed during the gas transfer step limits the advance of the desorption front toward the product end of bed, thereby limiting the concentration of unwanted impurities in the gas being transferred to the second bed.

into the product end of a second bed, and withdrawing a waste gas stream from the feed end of the second bed, terminating the withdrawing of the waste gas stream from the feed end of the second bed while continuing to withdraw the waste gas stream from the feed end of the first bed, continuing to withdraw the transfer gas from the product end of the first bed, and continuing to introduce the transfer gas into the product end of the second bed.

2. The gas transfer segment of claim 1 which further comprises introducing the feed gas mixture into the feed end of the second bed while continuing to withdraw the waste gas stream from the feed end of the first bed, continuing to withdraw the transfer gas from the product end of the first bed, and continuing to introduce the transfer gas into the product end of the second bed.

3. The gas transfer segment of claim 2 wherein the feed gas mixture is air, the pressure in the second bed is below atmospheric pressure, and introducing the feed gas mixture into the feed end of the second bed is effected by atmospheric air flowing into the feed end of the second bed.

4. The gas transfer segment of claim 3 wherein the waste gas streams are enriched in nitrogen relative to air.

5. A vacuum swing adsorption process for recovering a less strongly adsorbable component from a feed gas mixture containing at least one less strongly adsorbable component and at least one more strongly adsorbable component, which process comprises performing cyclic process steps in a plurality of adsorbent beds, each bed having a feed end and a product end and containing adsorbent material which selectively adsorbs the more strongly adsorbable component, each bed proceeding in turn through cyclic process segments which include an adsorption-make product segment, a decreasing pressure gas transfer segment in which gas flows from a bed at higher pressure into one or more other beds at lower pressure or pressures, a regeneration segment, an increasing pressure gas transfer segment in which gas flows into a bed at lower pressure from one or more other beds at higher pressure or pressures, and a final repressurization segment, wherein the decreasing pressure gas transfer segment includes the steps of withdrawing a first waste gas stream from the feed end of a first bed, withdrawing a transfer gas from the product end of the first bed and introducing the transfer gas into the product end of a second bed, withdrawing a second waste gas stream from the feed end of the second bed, terminating the withdrawing of the second waste gas stream from the feed end of the second

TABLE 2

Relationship of Cycle Steps Between Beds and Valve Position Chart for Example
(Vessel and Valve Numbers refer to FIG. 1)

| Vessel | Cycle Steps | | | | | | | | | | | | | | | |
|---|---|---|---|---|---|---|---|---|---|---|---|---|---|---|---|---|
| 13 | 1a | 1b | 2a | 2b | 2c | 3a | | | | 3b | 4a | 4b | 4c | 5a | 5b | 5c |
| 15 | 3a | 3b | 4a | 4b | 4c | 5a | 5b | 5c | 1a | 1b | 2a | 2b | 2c | | 3a | |

| Valve | Valve position (O = open, blank = closed) | | | | | | | | | | | | | | | |
|---|---|---|---|---|---|---|---|---|---|---|---|---|---|---|---|---|
| 5  | O | O |   |   |   |   |   |   |   |   |   |   | O | O | O | O |
| 23 | O | O |   |   |   |   |   |   |   |   |   |   |   |   | O |   |
| 41 |   |   | O |   |   |   |   |   |   |   |   |   |   |   |   |   |
| 17 |   |   |   | O | O | O | O | O | O | O | O |   |   |   |   |   |
| 7  |   |   |   |   | O | O | O | O | O | O |   |   |   |   |   |   |
| 25 |   |   |   |   |   |   | O |   |   | O | O |   |   |   |   |   |
| 43 |   |   |   |   |   |   |   |   |   |   | O |   |   |   |   |   |
| 19 | O | O | O |   |   |   |   |   |   |   |   | O | O | O | O | O |
| 37 |   | O | O | O | O |   |   |   |   | O | O | O | O |   |   |   |

What is claimed is:

1. A gas transfer segment of a vacuum swing adsorption process cycle utilizing multiple parallel adsorbent beds which undergo cyclic process steps to separate the components of a feed gas mixture, each bed having a feed end and a product end, wherein the gas transfer segment comprises the steps of withdrawing a waste gas stream from the feed end of a first bed, withdrawing a transfer gas from the product end of the first bed and introducing the transfer gas bed, withdrawing a third waste gas stream from the feed end of the first bed, continuing to withdraw the transfer gas from the product end of the first bed, and continuing to introduce the transfer gas into the product end of the second bed.

6. The process of claim 5 which further comprises introducing the feed gas mixture into the feed end of the second bed, withdrawing a fourth waste gas stream from the feed end of the first bed, continuing to withdraw the transfer gas from the product end of the first bed, and continuing to introduce the transfer gas into the product end of the second bed.

7. The process of claim 6 wherein the ratio of the quantity of the first waste gas stream to the total quantity of the first, third, and fourth waste gas streams is between about 0.15 and about 0.30.

8. The process of claim 5 wherein the feed gas mixture is air and the pressure in the second bed is below atmospheric pressure so that atmospheric air flows into the feed end of the second bed.

9. The process of claim 8 wherein the waste gas streams are enriched in nitrogen relative to air.

10. The process of claim 8 wherein the first waste gas stream is withdrawn by discharging from a superatmospheric pressure in the first bed directly to the atmosphere, and wherein the third waste gas stream is withdrawn from the first bed by a vacuum blower.

11. A pressure swing adsorption process for recovering a less strongly adsorbable component from a pressurized feed gas containing at least one less strongly adsorbable component and at least one more strongly adsorbable component, which process comprises performing cyclic process steps in two parallel adsorbers, each adsorber having a feed end and a product end and containing adsorbent material which selectively adsorbs the more strongly adsorbable component, which cyclic process steps include:

(a) providing a feed gas at superatmospheric pressure and introducing the feed gas into the feed end of a first adsorber, selectively adsorbing a portion of the more strongly adsorbable component on the adsorptive material, and withdrawing from the product end of the first adsorber a product gas enriched in the less strongly adsorbable component;

(b) terminating the introduction of the feed gas into the feed end of the first adsorber, depressurizing the first adsorber by withdrawing a first waste gas stream from the feed end of the first adsorber and by withdrawing a transfer gas from the product end of the first adsorber, introducing the transfer gas into the product end of a second adsorber, and withdrawing a second waste gas stream from the feed end of the second adsorber;

(c) terminating withdrawal of the transfer gas from the product end of the first adsorber and withdrawing a third waste gas from the feed end of the first adsorber;

(d) pressurizing the first adsorber by any combination of (1) introducing feed gas into the feed end thereof; (2) introducing product gas into the product end thereof, and (3) introducing feed gas into the feed end thereof and introducing product gas into the product end thereof; and (e) repeating steps (a) through (d) in a cyclic manner.

12. The process of claim 11 wherein the feed gas is air, the at least one less strongly adsorbable component is oxygen and the at least one more strongly adsorbable component is nitrogen, the first waste gas stream from the first adsorber is discharged directly to the atmosphere, and the third waste gas stream is withdrawn from the first adsorber by evacuation with a vacuum blower.

13. The process of claim 11 which further comprises, following step (a), the additional step of withdrawing a portion of the product gas from the first adsorber and using this portion of gas to purge the second adsorber.

14. The process of claim 11 which further comprises, following step (b), the additional step of (b1) terminating the withdrawing of the second waste gas stream from the feed end of the second adsorber, withdrawing a fourth waste gas stream from the feed end of the first adsorber, continuing to withdraw the transfer gas from the product end of the first adsorber, and continuing to introduce the transfer gas into the product end of the second adsorber.

15. The process of claim 14 which further comprises, following step (b1), the additional step of (b2) withdrawing a fifth waste gas stream from the feed end of the first adsorber, continuing to transfer gas from the product end of the first adsorber to the product end of the second adsorber, and introducing feed gas into the feed end of the second adsorber.

16. The process of claim 18 wherein the feed gas is air, the at least one less strongly adsorbable component is oxygen and the at least one more strongly adsorbable component is nitrogen, the first waste gas stream from the first adsorber is discharged directly to the atmosphere, and the third, fourth, and fifth waste gas streams are withdrawn from the first adsorber by evacuation with a vacuum blower.

17. The process of claim 16 wherein the feed gas mixture is air, the pressure in the second adsorber is below atmospheric pressure, and introducing the feed gas mixture into the feed end of the second adsorber is effected by atmospheric air flowing into the feed end of the second adsorber.

* * * * *